United States Patent [19]

Wood

[11] 3,927,725
[45] Dec. 23, 1975

[54] MULTIPLE WEIGHT SYSTEM WEIGHING MACHINE

[76] Inventor: Daniel R. Wood, 2832 Willing Ave., Fort Worth, Tex. 76110

[22] Filed: Mar. 24, 1975

[21] Appl. No.: 561,043

[52] U.S. Cl................................ 177/171; 177/246
[51] Int. Cl.² ..................... G01G 23/14; G01G 1/18
[58] Field of Search ........... 177/171, 197, 246, 247, 177/252

[56] References Cited
UNITED STATES PATENTS

| 14,382 | 3/1856 | Yost............................... 177/171 X |
| 351,528 | 10/1886 | Reynolds ........................ 177/252 X |
| 3,506,078 | 4/1970 | Homs.............................. 177/246 X |
| 3,574,321 | 4/1971 | Sheerer.............................. 177/247 |

FOREIGN PATENTS OR APPLICATIONS 959,617   6/1964   United Kingdom................. 177/247

Primary Examiner—George H. Miller, Jr.
Attorney, Agent, or Firm—Robert A. Felsman

[57] ABSTRACT

A weighing machine that will indicate weight in any weight system desired utilizing a single graduated scale. A beam is supported by a fulcrum on a stand. A weight pan is hung from the beam on one side of the fulcrum, and a slidable poise of variable weight is carried on the beam on the side opposite the weight pan. A graduated scale is affixed to the beam on the side opposite the weight pan and has its zero in the vertical plane of the fulcrum. The mass and center of gravity of the beam on one side are adjustable to balance with the other side while the poise is at zero and in the vertical plane of the fulcrum. This enables poises corresponding to other weight systems to be attached to the beam without disturbing its equilibrium. Consequently the scale will indicate whatever units the poise is designed for.

8 Claims, 9 Drawing Figures

MULTIPLE WEIGHT SYSTEM WEIGHING MACHINE

BACKGROUND OF THE INVENTION

1. Field of the Invention

This invention relates in general to weighing machines and in particular to a beam weighing machine that will indicate weight in multiple weight systems with a single graduated scale.

2. Description of the Prior Art

Beam type weighing machines wherein a beam is supported on a fulcrum with the object to be weighed hung from one side, and a poise slidable on a graduated scale fixed to the other side are well known. To measure the weight of an object on this type of weighing machine, initially the beam is balanced while the poise is at zero on the scale, then the object is hung on the load side and the poise advanced along the scale until the beam balances. The graduations and indicia on the scale will indicate weight in whatever system the beam is designed for.

In prior art machines of this type, zero of the scale is to one side of the fulcrum, therefore, changing the weight of the poise places the machine out of balance. Before it would properly indicate weight in another weight system corresponding to another poise, the beam would have to be balanced again to account for the different weight of poise. Because of the different poise weight, this may not be possible.

There is a prior art weighing machine that will weigh in two systems and is disclosed in U.S. Pat. No. 3,506,078 D. M. Horns on Apr. 14, 1970. However, this machine utilizes two separate graduated scales, each having graduations and indicia to correspond to a different weight system.

SUMMARY OF THE INVENTION

One of the objects of this invention is to provide an improved beam type weighing machine. Another object of this invention is to provide an improved beam type weighing machine that will indicate weight in multiple systems on a single graduated scale merely by changing the weight of the poise and without further adjustment.

In accordance with these objects, the weighing machine is provided with a beam which contains a slidable poise that may be positioned directly in the vertical plane of the fulcrum. One side of the beam is adjustable so that the beam will balance while the poise is directly in the vertical plane of the fulcrum. Consequently, varying the weight of the poise to correspond to different weight systems does not disturb the beam once balanced. The graduated scale has its zero in the vertical plane of the fulcrum and will read in whatever system the particular poise is calabrated for.

DESCRIPTION OF THE PREFERRED EMBODIMENT

Figure 1:
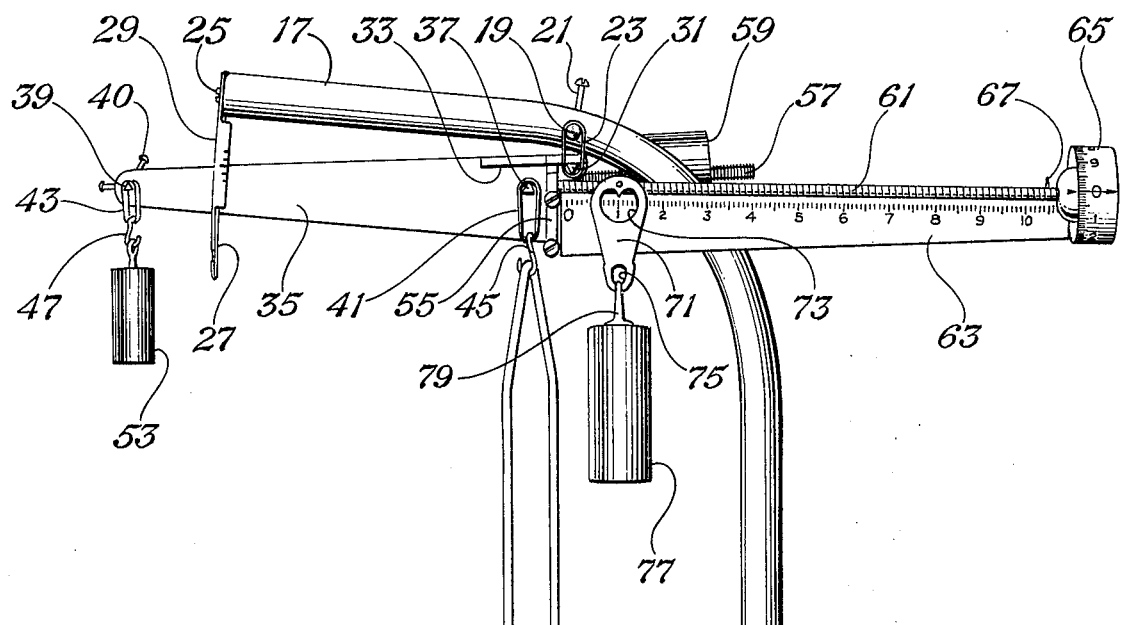
FIG. 1 is a perspective view of a weighing machine in accordance with this invention.
Figure 2:
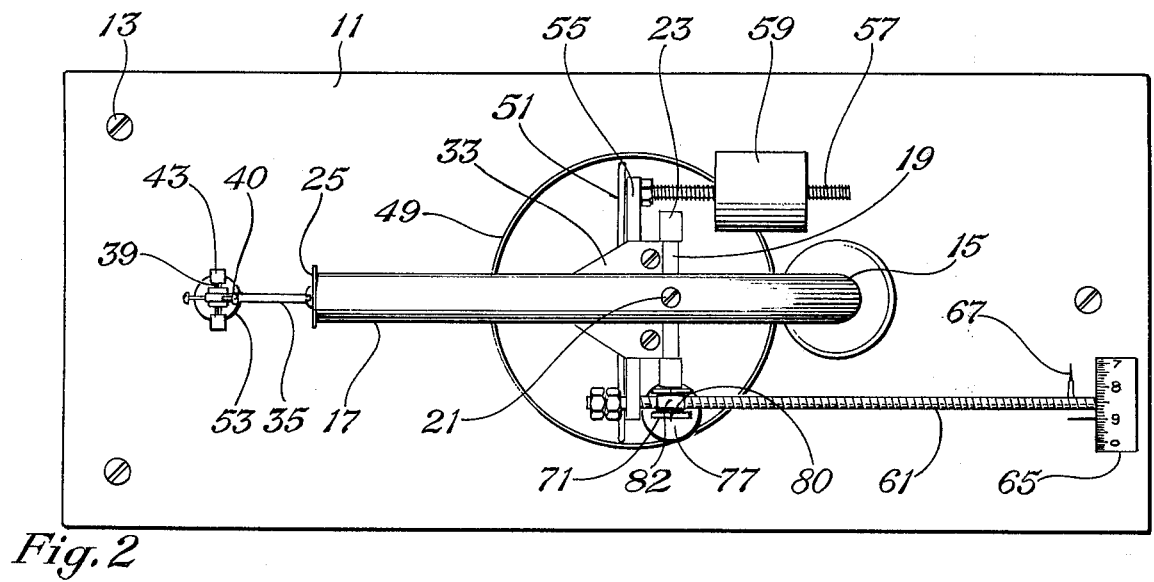
FIG. 2 is a top elevational view of the weighing machine shown in FIG. 1.

Referring initially to FIGS. 1 and 2, a beam type weighing machine is shown including its stand. The stand comprises a rectangular base 11 of wood or metal having set screws 13 spaced for leveling.

Part of the stand is an elongated member, as metal tube 15, extending upwardly therefrom. The tube 15 is bent at an obtuse angle at a selected distance from base 11, forming arm 17. Arm 17 is laterally disposed generally along the length of the base 11 and is at an acute angle with respect to base 11. Transversely piercing arm 17 toward the end of the bent portion is a pin 19, held in position by screw 21. Each end of pin 19 extends beyond arm 17, and elongated metal loops 23 slipped loosely over each of these ends. At the end of arm 17, a bracket 25 having a slot 27 and face 29, with horizontal lines to indicate balance, is secured to arm 17 and extends downwardly.

At the bottom of loops 23 a fulcrum 31, comprising a V-shaped knife edge in a selected vertical plane, is carried with its edge transverse to the arm 17. The top of the fulcrum 31 is secured to a metal plate 33 that is attached to a lever 35. Lever 35 is a flat metal plate extending perpendicularly to the longitudinal axis of the fulcrum 31 through slot 27 and terminating at a selected distance beyond bracket 25. A second fulcrum, as V-shaped knife edge 37, extends from lever 35 at a selected distance from fulcrum 31 and slightly below. A third fulcrum, as V-shaped knife edge 39, extends from lever 35 at a point 10 times the distance from knife edge 37 to fulcrum 31. Knife edge 39 fits within an oblong hole (not shown) in lever 35 and set screws 40 position and lock knife edge 39 precisely at the proper distance. The longitudinal axis of knife edges 37, 39 are perpendicular to the axis of the lever and parallel to the longitudinal axis of fulcrum 31. Elongated loops 41, 43 fit loosely over each knife edge 37, 39 similar to loop 23. Hanging means, as hooks 45, 47, are suspended from each loop 41, 43. A weight carriage, illustrated as weight pan 49 suspended by bail 51, hangs interchangeably from hooks 45 or 47. A tare poise 53, equal to the weight of the weight pan 49 and bail 51, is suspended interchangeably from either of the hooks 45 or 47.

A bracket 55 is secured to lever 35 between knife edge 37 and fulcrum 31, and extends in a vertical plane perpendicular to lever 35. On one side of the bracket 55, a balance adjusting means, comprising a threaded screw 57 and cylindrical weight 59 threaded thereon, is secured to the bracket 55. Threaded screw 57 is aligned generally parallel to the longitudinal axis of lever 35 and extends in the opposite direction. On the other side of the bracket 55, a threaded rod 61 is attached through a hole in the bracket 55, the hole being slightly larger than the rod 61 so that the rod is rotatable. Both the threaded screw 57 with its weight 59 and the threaded rod 61 extend parallel to the lever 35 and in the opposite direction from the bracket 55. Tube 15 with its arm 17 extends between the threaded rod 61 and cylindrical weight 59.

A graduated scale 63 is fixed to bracket 55 and is aligned directly below and parallel to rod 61, and is laterally disposed from lever 35. Scale 63 is notched or fixed on a metal plate and comprises indicia indicating slightly more than ten major divisions, which are respectively divided into 10 smaller divisions. The zero of the scale is directly below the knife edge of fulcrum 31, thus in the vertical plane of the fulcrum. One major division is the length of the distance from knife edge 37 to fulcrum 31. Ten threads of threaded rod 61 correspond to one major division of scale 63.

A graduated drum 65 is secured to the end of the threaded rod 61 and is adjacent the end of scale 63. Drum 65 is graduated into 10 major divisions, each containing 10 smaller divisions. One full rotation of the drum corresponds to one small division of scale 63.

A hanging means, as hook 67, is located slightly beyond the tenth major division of scale 63. A weight 69, shown detached, is designed for attachment to hook 67 for doubling the capacity of the weighing machine.

A hanger 71, extending over scale 63 and slidably carried by threaded rod 61, comprises a flat plate having an aperture, designated by numeral 73, for viewing the graduated scale, and hanging means, as hole 75, for hanging a poise 77 by its hook 79. The hanger 71 rests on a pin 80 (FIG. 2) which is part of a slider 82 which rests in the threads of the rod 61. Hanger 71 may be lifted up slightly and manually moved along the rod 61, or may be advanced along the threads by rotating rod 61 by means of drum 65. One full rotation of drum 65 advances hanger 71 one small division.

In operation, the combination comprising the lever 35, threaded rod 61, scale 63, and balance adjusting means serve as the beam for the weighing machine. Before the object to be measured is placed in the weight pan 49, the poise 77 must be at zero in the vertical plane of fulcrum 31 and the beam must be at equilibrium. At equilibrium the masses on either side of the fulcrum are balanced by adjusting weight 59 so that the resultant center of gravity of the beam passes through the plane of the fulcrum 31. At this point, the moment on one side of the beam equals the moment on the other side of the beam. While achieving initial equilibrium, the weight pan 49 may be either in the gross mode, as illustrated, with the pan 49 hanging from knife edge 37 and tare poise from knife edge 39, or in the sensitive mode with the weight pan 49 hanging from knife edge 39 and tare poise 53 from knife edge 37.

Once initial equilibrium is achieved, the poise 77 and hanger 71, being at zero and in the vertical plane of the fulcrum 31, do not effect the beam balance. Poise 77 may be removed entirely and another weight poise substituted without disturbing the equilibrium. Consequently hanger 71 serves as a conversion means to other weight systems, since it allows the poise 77 to be detached and others to be placed thereon.

After initial equilibrium is achieved, the object to be weighed, illustrated as numeral 81, is placed in the weight pan 49. A poise 77 corresponding to whatever weight system desired is hung on the hanger 71 and advanced forward along scale 63 manually and by rotating drum 65 until balance is achieved. With the weighing machine in the gross mode, as illustrated, the indicia of the scale will read directly in the weight system of the poise.

In the preferred embodiment, the weight of the poise 77 and hanger 71 equal one basic unit of whatever weight system is being used. For example, if it is desired to weigh in kilograms, poise 77 is constructed to weigh one kilogram including its hook 79 and the hanger 71. Consequently, if the object 81 weighs 1 kilogram, the beam will be at balance while the poise is hanging at unit one on the scale 63. If the same object 81 is desired to be measured in pounds, poise 83, whose weight combined with hanger 71 equals 1 pound, is substituted for poise 77. The beam will balance again when poise 83 is advanced to 2.2 and the drum 65 rotated to 4 6/10 small divisions, thereby indicating 2.2046. Any poise weight may be utilized so long as it does not exceed the beam and stand strength. While in the gross mode, the indicia of scale 63 will indicate weight according to the indicia reading multiplied by the poise and hanger 71 weight.

In the sensitive mode, weight pan 49 changes position with tare poise 53. Because the distance to the fulcrum 31 is thereby increased 10 times, the sensitivity is 10 times greater. A 1 pound weight in the pan must be balanced by pound poise 83 at indicia 10 on scale 63. The indicia of scale 63 indicate weight in this mode as the reading multiplied by one-tenth times the weight of the poise and hanger 71 weight.

The capacity of the weighing machine may also be multiplied to an extent depending on beam strength. Weight 69 is designed to double the capacity in the pound gross mode. Weight 69 is hung from hook 67, which is slightly past the ten indicia in order to prevent the weight 69 from interferring with poise 83 movement. To account for the extra distance of the moment arm, weight 69 is slightly less than 1 pound. To operate in this mode, the doubling weight 69 is attached after the scale has been balanced in initial equilibrium through adjusting weight 59. With the doubling weight 69 attached and poise 83 at zero, a 10 pound object in the pan will balance the beam. Accordingly the indicia of the scale indicate weight as 10 plus the indicia unit; i.e. indicia one indicates 11 pounds.

Figure 3:
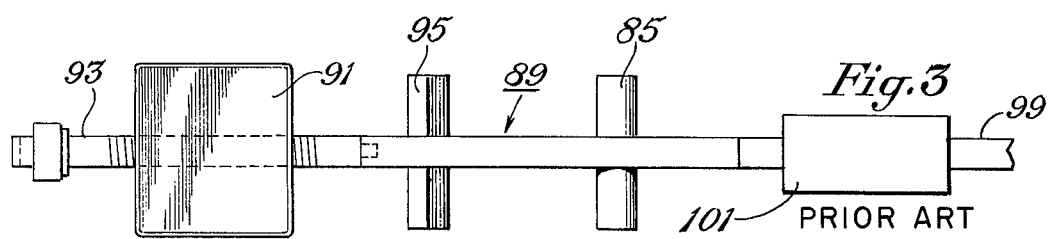
FIG. 3 is a partial top elevational view of a prior art beam construction for a platform weighing machine.
Figure 4:
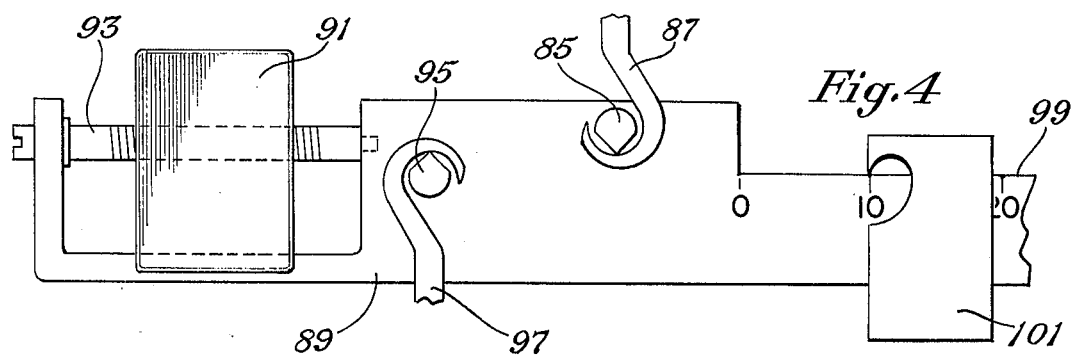
FIG. 4 is a partial elevational view of the beam construction shown in FIG. 3.

The principle of this invention of constructing a beam type weighing machine so that the poise and scale zero may be placed in the vertical plane of the fulcrum may be applied to existing weighing machines. FIGS. 3 and 4 indicate the beam construction of a conventional platform weighing machine commonly used in hospitals for measuring people's weight.

The conventional machine of this type includes a beam supported on a V-shaped knife edge fulcrum 85, which pivotally engages a linkage 87 attached to a stand (not shown). The beam comprises a lever 89 on one side of fulcrum 85, which has adjusting means illustrated as weight 91. Weight 91 is threaded on a rod 93, which is rotatably attached to the lever 89 so that the weight may be moved along the longitudinal axis of lever 89.

A second fulcrum, as knife edge 95, extends perpendicularly through lever 89. This knife edge 95 is linked by a rod 97 to a weight carriage, as a platform (not shown), for placing objects to be weighed. On the side of the beam opposite the fulcrum 85, a graduated scale 99 is fixed. In the prior art, the zero is at a selected distance to one side of fulcrum 85. A poise 101 fits slidably on the scale 99. This prior art weighing machine will indicate weight in only one weight system.

Figure 5:
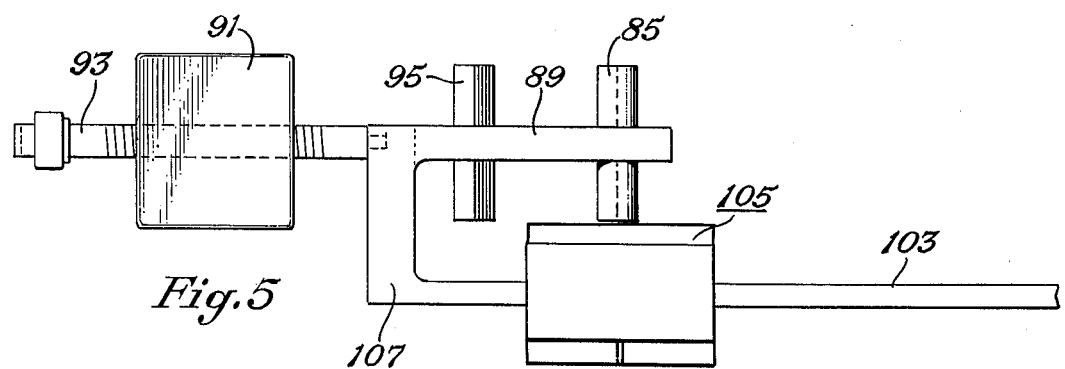
FIG. 5 is a partial top elevational view of a beam construction constructed in accordance with this invention for a platform weighing machine.
Figure 6:
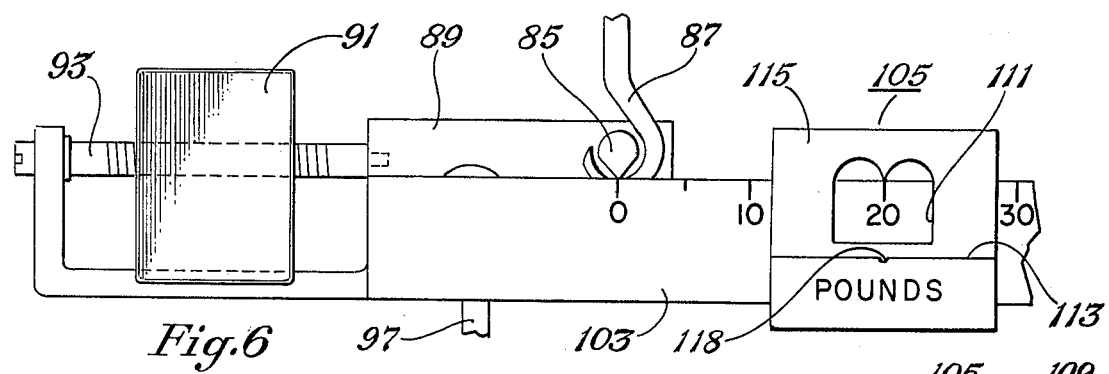
FIG. 6 is a partial elevational front view of the beam construction of FIG. 5.
Figure 7:
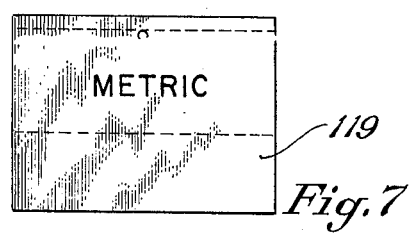
FIG. 7 is a front elevational view of a metric poise adapted to be attached to the pounds of FIGS. 5 and 6.
Figure 8:
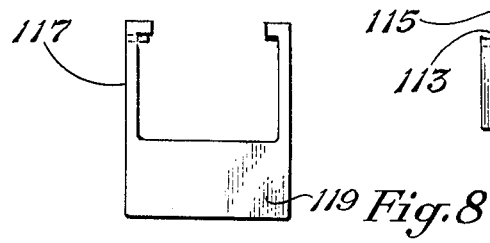
FIG. 8 is a side elevational view of the poise of FIG. 7.

In order to modify this type of beam weighing machine to indicate weight in multiple weight systems, modifications must be made as shown as in FIGS. 5 through 9. As illustrated in FIGS. 5 and 6, the beam is identical with respect to the fulcrum 85, lever 89, knife edge 95, linkage 87, 97, and adjusting means. However the scale 99 and poise 101 are modified as shown by the numerals 103 and 105 respectively in order to allow the poise 105 to be placed in the vertical plane of the fulcrum 85, and to place the zero of scale 103 in the vertical plane of fulcrum 85. Also poise 105 is modified so that its weight can vary, serving as conversion means to change to other weight systems.

In the improved beam construction, a bracket 107 is attached to lever 89 and extends in a vertical plane perpendicularly to lever 89. As illustrated bracket 107 is positioned between knife edge 95 and rod 93, and must be at a sufficient distance from fulcrum 85 so that the center of gravity of poise 105 can be placed in the vertical plane of fulcrum 85. Lever 89 terminates slightly adjacent fulcrum 85.

Scale 103 is offset from the vertical plane of lever 89 and affixed to bracket 107 so that there is a sufficient clearance between fulcrum 85 and scale 103 for poise 105 to slide between. Scale 103 is aligned generally parallel to the lever 89 and extends in the opposite direction, thereby comprising one-half of the beam.

Figure 9:
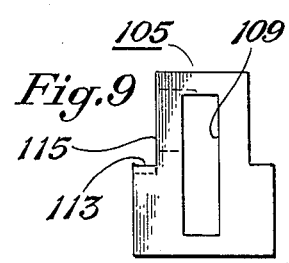
FIG. 9 is a side elevational view of the pounds poise of FIGS. 5 and 6 shown detached from the beam construction.

Poise 105 contains a longitudinal rectangular passage designated as numeral 109, so that it may be placed on and slid along scale 103. There is also an aperture, designated by numeral 111, for viewing indicia on scale 103. Poise 105 as illustrated in FIGS. 6 and 9, contains conversion means to weigh in two systems, illustrated as pounds and kilograms. Conversion means comprises means for attaching a second poise, as ledges 113, extending horizontally across faces 115 of poise 105. Ledges 113 mate and lock by notch 118 with corresponding lips 117 on a second poise 119. Poise 119 hangs on ledges 113 of poise 105, and the weight of poise 119 is sufficient to convert the system to metric. The weight of both poise 105 and 119 depends upon the distance between fulcrum 85 and knife edge 95, and the scale desired.

To operate the improved weighing machine in the pound mode, the beam must initially be balanced while the poise is at zero. The object to be weighed is placed on the platform (not shown) and poise 105 slide along scale 103 until balance is once again achieved. Scale 103 will read directly in pounds. To operate the improved weighing machine in the kilogram mode, it is not necessary to again achieve equilibrium since the poise weight has no effect on this. Poise 119 is merely hung on poise 105 and the combination slid along scale 103 until balance again achieved. Scale 103 will directly read in kilograms.

Existing beam construction may be modified accordingly, or a beam constructed in accordance with this invention may be fitted to existing weighing machines.

It should be apparent from the foregoing description that an invention having significant advantages has been provided. Weight may be measured in an indefinite number of weight systems without the need for conversion tables. The single graduated scale is used for all of the different systems, avoiding the confusion of different indicia on one scale, and also avoiding the need for multiple scales. Weighing machines constructed according to this principle add flexibility yet do not add complexity or expense.

While this invention has been shown in only two of its forms, it should be apparent to those skilled in the art that it is not so limited but is susceptible to various changes and modifications without departing from the spirit thereof, and it may be adapted to other beam type weighing machines of configurations not shown.

What is claimed is:

1. A weighing machine comprising:
   a stand;
   a fulcrum carried by the stand in a selected vertical plane;
   a beam carried by the fulcrum;
   a weight carriage carried by the beam on one side of the fulcrum;
   a poise carried by the beam on the opposite side of the fulcrum, said poise being movable along the beam;
   conversion means supported by the beam to enable variation of the weight of the poise to correspond to other weight systems;
   a graduated scale affixed to the beam on the side of the fulcrum opposite the weight carriage and having its zero in said vertical plane;
   the beam having its resultant center of gravity in said vertical plane while the poise is at zero.

2. The weighing machine as defined by claim 1 wherein the beam is carried below the fulcrum.

3. The weighing machine as defined by claim 1 wherein said conversion means comprises a hanger movably attached to the beam on the side of the fulcrum opposite the weight carriage, said hanger having means for hanging poises of weights corresponding to different weight systems.

4. The invention as defined by claim 1 wherein said conversion means comprises a first permanently affixed poise corresponding to a first weight system having means for attaching a second poise, the total weights of the two poises corresponding to a second weight system.

5. A weighing machine comprising:
   a stand;
   a fulcrum carried by the stand in a selected vertical plane;
   a lever carried by the fulcrum;
   a weight carriage carried by the lever;
   a graduated scale laterally disposed from the lever and having its zero in said vertical plane;
   a poise carried slidably by the scale;
   conversion means carried by the scale to enable varying the weight of the poise to correspond with other weight systems;
   adjusting means supported by the fulcrum for equalizing the resultant moment on one side of the fulcrum with the resultant moment on the other side of the fulcrum while the poise is at zero and in the vertical plane of the fulcrum.

6. The weighing machine as defined by claim 5 wherein the weight of the poise added to the weight of the conversion means equals one basic weight unit of a weight system.

7. The weighing machine as defined by claim 5 wherein the distance from the point on the lever at which the weight carriage is carried to the fulcrum equal one major division unit on the scale.

8. In a beam construction for a weighing machine of the type having a weighing platform supported on one side of a fulcrum and a slidable poise on the other side:
   a lever, having means for attaching the weighing platform, carried by the fulcrum in a selected vertical plane intermedicate one end of the lever;
   a bracket secured to the lever adjacent the fulcrum, said bracket extending in a vertical plane substantially perpendicular to the lever;
   a graduated scale secured to the bracket intermediate its end, extending laterally substantially parallel to the lever and in a different vertical plane than the lever, said scale having its zero in the vertical plane of the fulcrum point;
   a first poise corresponding to a first weight system slidably carried along the weight scale and having means for attaching a second poise, the total weights of the two poises corresponding to a second weight system;
   a weight secured to the lever and movable parallel to the horizontal axis of the lever to equalize the resultant moment on one side of the fulcrum with the resultant moment on the other side of the fulcrum while the poise is at zero and in the vertical plane of the fulcrum.

* * * * *